Sept. 2, 1952 K. F. KIRCHNER 2,609,531

INDUCTANCE DEVICE

Filed Dec. 3, 1947 3 Sheets-Sheet 1

INVENTOR
KARL F. KIRCHNER
BY *Truman L. Styner*
ATTORNEY

Sept. 2, 1952 K. F. KIRCHNER 2,609,531

INDUCTANCE DEVICE

Filed Dec. 3, 1947 3 Sheets-Sheet 2

INVENTOR
KARL F. KIRCHNER
BY Truman L. Stygner
ATTORNEY

INVENTOR
KARL F. KIRCHNER
BY Freeman L. Stryker
ATTORNEY

Patented Sept. 2, 1952

2,609,531

UNITED STATES PATENT OFFICE 2,609,531

INDUCTANCE DEVICE

Karl F. Kirchner, Bloomfield, N. J.

Application December 3, 1947, Serial No. 789,483

7 Claims. (Cl. 336—80)

My invention relates to inductance devices and is particularly directed to transformers, coils, reactors, and the like adapted for use in intermediate, high, and ultra-high frequency circuits.

Adjustability of resonant circuits was generally accomplished until recently by variation of capacitance in the circuits, air insulated tuning condensers being standard components in tuners of many types. Since the advent of powdered iron cores, however, considerable progress has been made in the development of inductance type tuners, the so-called permeability tuner being an example. Such tuners comprise a winding on an insulating sleeve through which a plunger of compressed powdered iron is reciprocated, the position of the plunger along the sleeve axis determining the permeability of the magnetic circuit of the coil and hence the inductance of the coil.

Now that the technic of manufacturing the powdered iron cores has been refined to the point where core losses (eddy current and hysteresis losses) are reduced to reasonable values in the radio, television and micro-wave bands, the needs for permeability tuners in these bands may be met. However, the plunger type tuner mentioned, used heretofore only at intermediate and broadcast-band frequencies has many disadvantages. First, the coil-plunger assembly is too large for many applications, it being necessary to provide sufficient room to completely withdraw the plunger for minimum inductance. Second, coupling between the slidable core and the windings on the insulating sleeve is loose, of necessity, and the amount of inductance change for a given movement of the plunger is small. Third, large air gaps occur in the magnetic circuit, and there is considerable fringing of the electromagnetic line of force at the pole faces, or ends of the plunger, and the precise position of the plunger cannot be accurately predetermined for a given inductance and frequency. Metal shield cans are usually placed over the tuner, and to keep the can size within reasonable limits, the spacing between the walls of the cans and the coils and plunger must be small. But close spacing here means high frequency eddy losses in the can as well as reduced inductance change for a given plunger movement.

The general object of my invention is an improved inductance device for high frequencies.

A more specific object of my invention is an inductance device for high frequencies which may be adjusted over wide ranges of inductance values.

A still more specific object of my invention is an inductance device that is small in size, and yet is effectively shielded, and that may be varied with accurately predetermined inductance values over a wide range of frequencies with relatively low losses.

The scope of my invention is defined with particularity in the appended claims and preferred embodiments are described in the following specification and shown in the accompanying drawing in which:

One of the preferred embodiments of my invention comprises two windings, which may be designated primary and secondary windings, on a low-loss, high-permeability core structure. The two coils having mutual inductance between them can serve as a transformer or as a reactance depending on the coil connections. The core structure is in two parts, each part being in shape generally of the horseshoe or U type, and each having two flattened pole faces. The two pairs of pole faces are relatively movable so that the polarity of one pair of poles may be selectively changed from an in-phase to a 180 degree out-of-phase position with respect to the other pair of poles without change in reluctance of the magnetic circuit. The mutual inductance of the windings may thus be reduced to zero, when the flux of the windings are equal and oppose, and may be smoothly and linearly varied to a maximum when the fluxes are in phase and aiding.

The particular inductance device shown in

Figure 1:
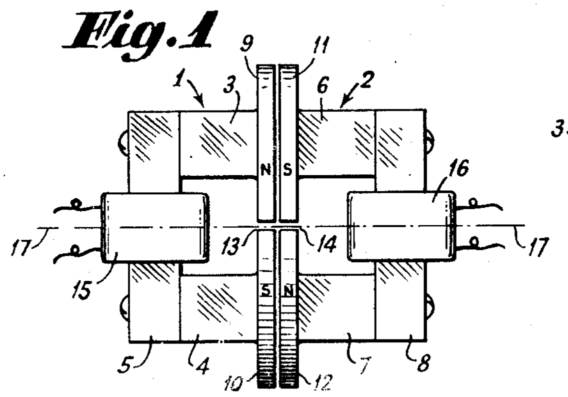
Figures 1 and 2 show, respectively, the plan and elevation of one of my novel inductance devices.

Figure 1 comprises two separate and relatively movable horseshoe type core members 1 and 2, each member being composed of magnetic material, such as commercial grades of ferric particles which can be pressed into desired shapes and which can be machined like iron. Legs 3 and 4 of one core member may be formed integrally with the transverse or base portion 5 of member 1, or may be separately formed and joined by stud bolts as shown. The other core member is of similar size and shape, and comprises legs 6 and 7 and base 8. The pole face portions 9 and 10 of the core member 1 are preferably semi-circular and spaced by a relatively narrow diagonal air gap 13, the pole faces 11 and 12 being similarly shaped and spaced at 14. The windings 15 and 16 encircle the cores 1 and 2, respectively, intermediate the ends of the poles, the particular windings shown being placed around the base portions 5 and 8. The magnetic polarity of the pole faces of one core member caused by alternating or direct current in the winding is thus opposite that of the other pole face of the member.

Figure 3:
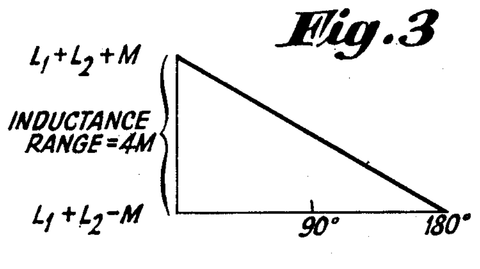
Figure 3 is a graph showing the inductance as a function of tuning position of my novel device.

Now, according to an important feature of my invention, one core member may move with respect to the other so that the relative positions of the pole faces 9, 10 and 11, 12 of the two core members may be reversed. With round poles as shown, rotation of one member about the center line 17 normal to the faces is contemplated. As one member rotates, its pole faces gradually shift or slide over the faces of the other core member, the amount of overlie of the separate faces and the proportion of aiding to bucking flux being easily and selectively controllable. The mutual inductance between the windings 15 and 16 may thus be said to be variable from a plus maximum to a minus maximum, as graphed in Figure 3, and the phase of alternating energy transmitted from one winding to the other transformer-fashion, may be reversed. If the self-inductances of the two windings are L1 and L2, respectively, and their mutual inductance is M, the total maximum inductance of the coils in series with unity in-phase coupling is $L1+L2+2M$, which may be varied to $L1+L2-2M$ for full out-of-phase coupling. The arithmetic difference of these two expressions is 4M and is a measure of the range of inductance of my device. It is important to note that the change of area of overlap of one pole face on the opposite pair of faces is directly proportional to the relative displacement of the core members (angular displacement in Figure 1) and that the change of mutual inductance is a linear function of displacement. With the pole faces in good contact, or in close spaced relation, the magnetic circuit of my device is substantially closed, and with the high permeability and high Q of the core material contemplated, fringing and stray electromagnetic lines of force are so reduced that coupling is tight or approaches unity and is to be contracted with the loose coupling of the conventional air-core variometer, which usually has a coefficient of coupling of less than .01, or of the conventional permeability tuner.

Figure 6:
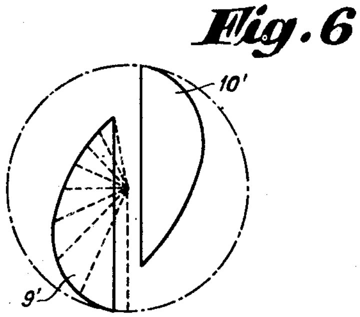
Figure 6 shows the core of the device of Figure 1 formed to provide a non-linear relationship of tuning position and inductance.

Whereas the simple semi-circular pole faces are shown and preferred for linear inductance variations, other functional relations of inductance and displacement are contemplated. To relieve crowding at the high frequency end of a tuning dial, for example, the pole faces may be irregular in shape. Outlines of two pole faces 9′ and 10′ for an exponential inductance-displacement relation is shown in Figure 6. The area of each elemental segment covered by the opposite moving pole face is progressively larger.

Figure 4:
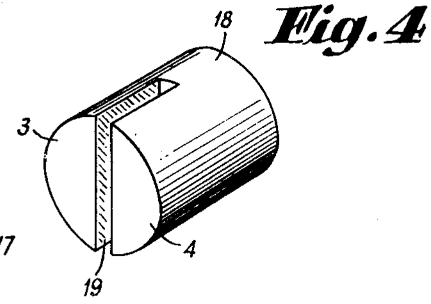
Figure 4 shows in perspective another embodiment of the core of my invention.
Figure 2:
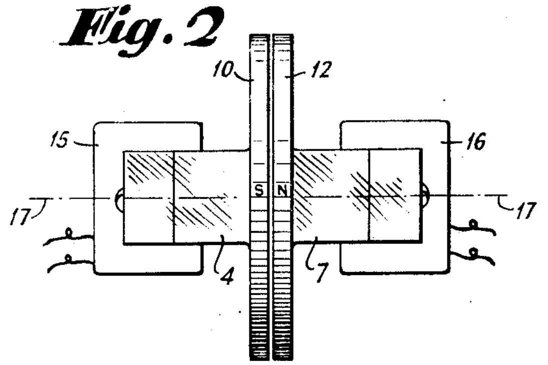

The core members may be given simpler forms, if desired. In Figure 4, for example, each core member comprises a single integral piece of magnetic material 18. A short cylindrical rod or slug of compressed powdered iron or other ferriferous material with high magnetic permeability and high Q is used, a straight-sided groove 19 being milled across one end to provide two legs corresponding to legs 3 and 4 of Figures 1 and 2. The width of the groove is determined primarily by the space required for the windings to be placed on the core.

Figure 5:
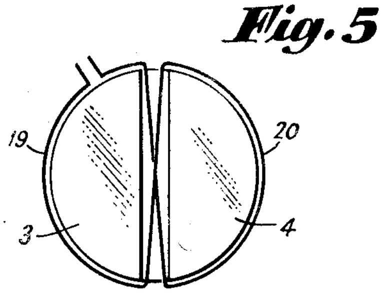
Figure 5 shows the core of Figure 4 with one turn of a winding in place.
Figure 8:
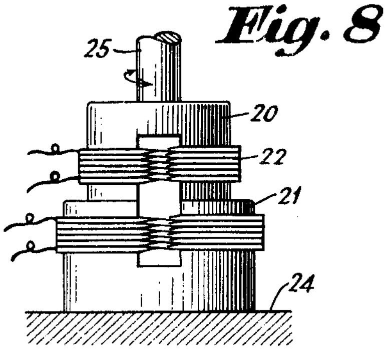

For minimum stray fields outside the core, the double D or figure 8 winding may be employed. The double D winding, is particularly adapted to the horseshoe core of my invention, the two D portions 19 and 20, Figure 5, of the winding being formed respectively over the legs of the core. Each turn of the wire is wound half way around one leg of the core member, then through the diagonal groove and around the other leg in the opposite direction. The energy induced in the two legs of the core is aiding, or in-phase, with respect to that core, and for a given ampere-turns concentrates the magnetic flux within the core. The fields of the two halves of windings of this type tend, even in air, to neutralize each other and minimize stray effects, and when my highly permeable and high-Q core is combined with this winding and arranged substantially coextensive with the normal in-air magnetic circuit, the strays are reduced to a minimum. Alternatively, separate windings can be placed over each leg and then connected so as to produce aiding flux in accordance with the right hand rule. The low stray field throughout the tuning range may be attributed in part to the closeness of the winding and core. The wire may be wound directly on the core, each turn being pulled tight. This is to be contrasted with the plunger type core where sufficient coil-to-core clearance must be provided for free reciprocation of the plunger, with a resulting reduced coupling coefficient.

With such complete confinement of the fields by my core arrangement, the inductance control is considerably extended and the benefits of a range of inductance of 4M is fully realized. I have obtained ranges of inductance of 25 and more to 1 at frequencies at which a range of no more than 12 to 1 could be obtained with conventional means.

Figure 7:
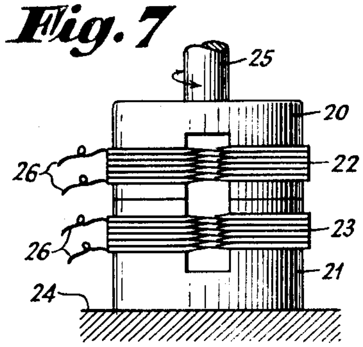
Figures 7, 8, 9 and 10 are elevational views of the assembled cores and coils of Figures 4 and 5.

When the two core members 20 and 21 with their windings 22 and 23 are assembled in coaxial relation as in Figure 7, one member 21 may be fixed in a stationary base or holder 24 and the other member 20 carried on a shaft 25 also coaxial with the members and journalled to rotate the member 20. Spring pressure may be applied to the member 20 to hold the four pole faces in firm yet slidable contact, or if a slight increase is desired in reluctance of the magnetic circuit, as where reduced mutual coupling is required, the journal for the shaft may be arranged to hold the pole faces in slight spaced relation. Since rotation of 180 degrees is sufficient for the full range of inductance adjustment, pig-tail connection 26 to the rotatable coil, or slip ring connections, need be provided only for one-half revolution of the coil.

Figure 9:
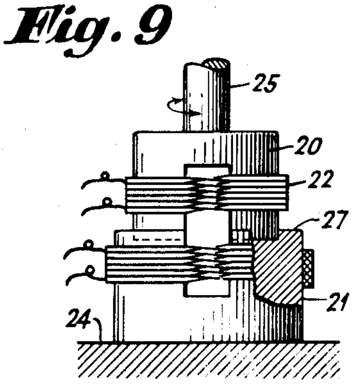

Where, for manufacturing reasons, it is not considered feasible to so closely machine the parts of the journal as to precisely hold the core members in axial alignment, one core member 21 may be made slightly larger in diameter than the other member as shown in Figure 8. Accidental eccentric or sidewise displacement of one core member with respect to the other will not cause erratic changes in the reluctance of the magnetic circuit. An extension of this feature of my invention comprises a shoulder or lip 27 along the circular edges of one pair of pole faces, as shown in Figure 9, to prevent sidewise slipping of one core member on the other.

Figure 10:
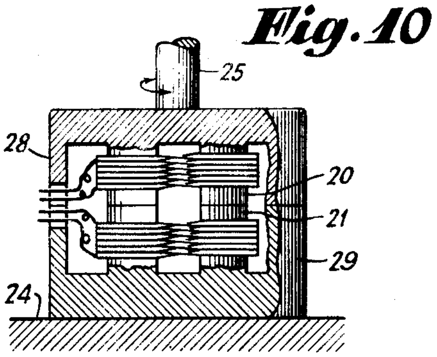
Figure 11:
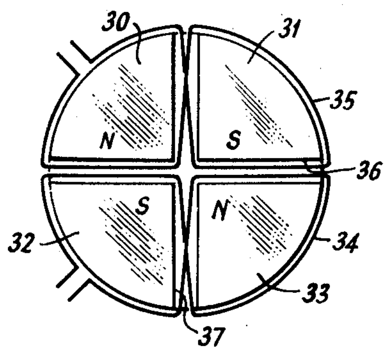
Figure 11 is an end view of a modified core member.

In Figure 10 the core members are fabricated integrally or otherwise with encircling skirts 28 and 29 joined to the transverse portions of the U-shaped core members. The complementary edges of skirts 28 and 29 are coplanar with, or in a plane parallel with, the pole faces so that the skirt edges are in contact when the pole faces are in operative position. It is to be noted here, the magnetic circuit is complete within the horseshoe portions of the members and but an inappreciable proportion of the electromagnetic lines of force are found in the skirts. The skirt portions of the assembly accordingly effectively shield the coils.

If desired, the full range of inductance variation may be effected in 90 degrees of relative rotation of the cores. In Figure 1 is shown a plan view of the pole faces of one core member divided into 90 degree quadrants 30, 31, 32 and 33, and the double D coil turns 34 and 35 so wound on the quadrant legs as to make the north poles alternate with the south poles. When the core members are round slugs of magnetic material, such as pressed powdered iron, right-angle grooves 36 and 37 are conveniently milled in the ends of the slugs. The windings may comprise separate coils on each leg, or two double D windings as shown, or a single set of turns of wire.

Figure 12:
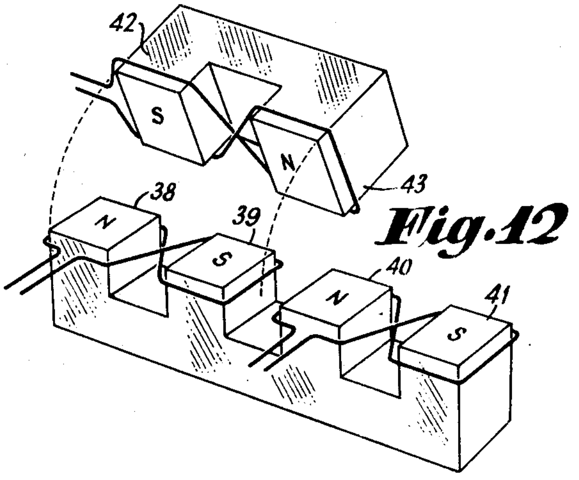
Figure 12 is an exploded view of another embodiment of my novel inductance device.

It will now be perceived that since my invention in its broader aspects contemplates the variation of inductance by shifting the relative position of the two pairs of magnetic poles, with substantially constant magnetic reluctance, the particular means for realizing the benefits of my invention are not limited to rotatable core members. One core member may slide rectilinearly over the other core member, for example. In Figure 12 one core member is provided with four aligned poles 38, 39, 40 and 41 and are so wound as to make their polarities alternate. The poles 42 and 43 of the other core member are broad enough to span the gaps between the lower poles, all the pole faces being milled to a common smooth plane. The full range of inductance variation may thus be effected by merely shifting one core member lengthwise on the other core member.

Figure 13:
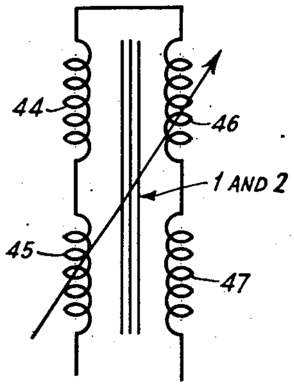
Figures 13, 14, 15 and 16 show circuit applications of my novel inductance device.
Figure 14:
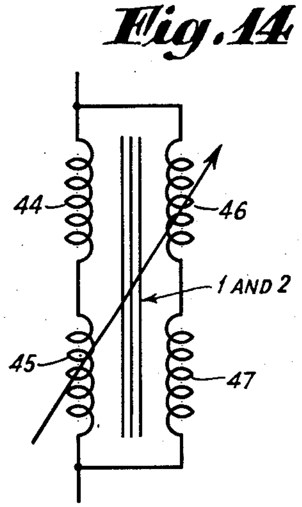

With the ends of each winding brought out, innumerable combinations of connections and uses may be made, Figures 13, 14, 15 and 16 being shown as examples of simple inductance and transformer connections. In Figure 13 four coils 44, 45, 46 and 47 are depicted, one for each leg of each core member, all being connected in series. The flux of two coils 44 and 45 is aiding with respect to each other, and with respect to the other two coils 46 and 47, but may be varied in position to oppose said other two coils. Such a simple variable inductance has been found to be well adapted as an antenna tuner, such as a tunable inductance in series with a loop antenna. By connecting the coils in parallel as shown in Figure 14, the current carrying capacity may be doubled although the Q value may lower some because of the greater flux density and higher eddy losses.

Figure 15:
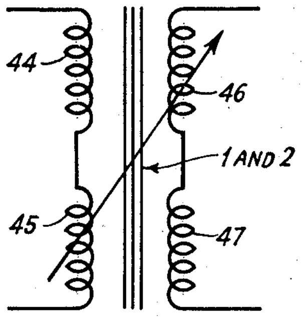
Figure 16:
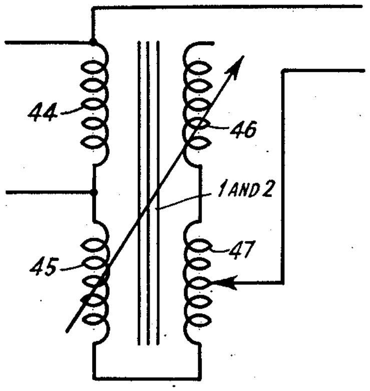

When my inductance device is connected as a simple transformer, shown in Figure 15, or as an auto-transformer as in Figure 16, the coupling between intermediate or radio frequency amplifier stages may be varied over wide ranges.

The variations of coupling between the primary and secondary windings may be used for band width control. It will be remembered that the Q of a transformer with a magnetic core is proportional for a given effective total resistance, to the inductances of the windings, comprising the sum of the self-inductances and the mutual inductance M. Hence, as the mutual inductance is varied by moving one core member on the other, the mutual inductance, and hence the Q is varied.

When my inductance device was used in the frequency determining circuit of an oscillator, in parallel with a tuning condenser, the inductance value could be reduced to such a low value the oscillations would abruptly stop. Where such stoppage is not desired, an extra winding or two may be added to one core member and thus prevent complete balancing and neutralization of the linking flux between the windings.

One inductance device constructed according to may invention and connected as shown in Figure 13, was successfully used as an antenna tuner, the two core members being each ¼ inch long, ½ inch in diameter. The core material was gray iron in appearance and is commercially obtainable as "Stackpole S52" metal, and according to available information, comprises powdered iron dispersed in a non-metallic body. The groove cut in the end of each core member was ⅛ inch wide and $\frac{5}{32}$ inch deep. Each double D winding comprised 40 turns of Number 42 Brown and Sharpe gauge 6-strand wire, also commercially obtainable as "Litz" wire. In parallel with a 100 m. m. f. condenser, the tank circuit thus formed was tuned to resonance throughout the broadcast frequency range. The measured Q was found to be substantially constant, being 55 at 550 kilocycles and 50 at 1500 kilocycles. Interesting comparisons may be made with one commercial plunger type permeability tuner designed for the 550–1500 kilocycle range. This tuner comprises a coil $\frac{3}{16}$ inch in diameter and 1¾ inches long. For minimum inductance the plunger must be withdrawn from the coil to make a coil and core total length of 3½ inches. The measured Q of this device was found to be about 25 and 50, respectively, at 550 and 1500 kilocycles.

My inductance device is adjustable with accurately predetermined inductance values over a wide range, is small in size, is effectively shielded, has low high-frequency losses, is simple to construct, and is easy to install and operate.

I claim:

1. A high frequency inductance device comprising a first core, said core being of a material having a predetermined permeability and core loss at the operating frequency and being U-shaped and having spaced flattened ends on the legs of the core, at least one winding on said core intermediate said ends, so that current in said winding will oppositely magnetically polarize said flattened ends, a second core with spaced pole faces juxtaposed with said flattened ends to substantially close the magnetic circuits of said cores, at least one winding on said second core, the first and second mentioned windings being connected, said second core being slidable on said flattened ends to selectively interchange the relative position of the pole faces, on said ends, the spacing between said ends being less than the width of said pole faces.

2. An inductance device comprising a U-shaped core member, said member being composed of ferriferous powder dispersed in a body having relatively high permeability and relatively low core losses at radio frequencies, a coil on said U-shaped core member to oppositely magnetically polarize the ends of the legs of said core member, said leg ends being spaced, co-planar, and symmetrically disposed about a point between said leg ends, said leg ends being so shaped the area of each elemental segment thereof traversed by a straight line rotated about said point is progressively larger.

3. An inductive device comprising a cylindrical core structure of relatively low high-frequency loss magnetic material, said structure being divided intermediate its ends along a plane transverse to the medial axis of the structure so that the divided parts are relatively rotatable about said axis, and means to oppositely magnetically polarize different areas of the surfaces of each of said parts in said plane.

4. An inductive device comprising a first and a second cylindrical core member, each member being composed of a coherent mass of low high-frequency loss magnetic material, a groove across one end of each member, a winding on each member with turns lying in the grooves to oppositely magnetically polarize the portions of the cylindrical members on opposite sides of said grooves, the windings being electrically connected, and the cylindrical members being axially aligned and relatively rotatable with the grooved ends of the members in close juxtaposition.

5. A radio frequency inductance device comprising a core composed of finely divided magnetic material, said core comprising a pair of U-shaped members, a winding on each member, the legs of one member aligned with the legs of the other member, the ends of the legs being closely justaposed and relatively movable in the plane of said ends of the legs, one of said core members being larger in diameter at the leg ends than the other core member.

6. A radio frequency inductance device comprising a core composed of finely divided magnetic material, said core comprising a pair of U-shaped members, a winding on each member, the legs of one member aligned with the legs of the other member, the ends of the legs being closely juxtaposed and relatively movable in the plane of said ends of the legs, one of said core members having a flange along the edges of the leg ends and encircling the leg ends of the other core member.

7. A radio frequency inductance device comprising a core composed of finely divided magnetic material, said core comprising a pair of U-shaped members, a winding on each member, the legs of one member aligned with the legs of the other member, the ends of the legs being closely juxtaposed and relatively movable in the plane of said ends of the legs, and a cup-shaped shield formed with each of said core members and substantially enclosing the core members.

KARL F. KIRCHNER.

REFERENCES CITED

The following references are of record in the file of this patent:

UNITED STATES PATENTS

| Number | Name | Date |
|---|---|---|
| 851,467 | Wood | Apr. 23, 1907 |
| 928,136 | Lacy | July 13, 1909 |
| 1,203,789 | Ryden | Nov. 7, 1916 |
| 1,340,027 | Dunham | May 11, 1920 |
| 1,353,145 | Clement | Sept. 21, 1920 |
| 1,367,734 | Curtis | Feb. 8, 1921 |
| 1,439,995 | Bird | Dec. 26, 1922 |
| 1,501,649 | Cummings | July 15, 1924 |
| 1,556,612 | Kloneck | Oct. 13, 1925 |
| 1,639,044 | Mansbridge | Aug. 16, 1927 |
| 1,641,925 | Gabriel | Sept. 6, 1927 |
| 1,691,125 | Polydoroff | Nov. 13, 1928 |
| 1,716,553 | Higbee | June 11, 1929 |
| 2,042,020 | Roe | May 26, 1936 |
| 2,107,172 | Agricola | Feb. 1, 1938 |
| 2,209,236 | Rowell | July 23, 1940 |
| 2,213,328 | Schaper | Sept. 3, 1940 |
| 2,275,904 | Howe | Mar. 10, 1942 |
| 2,288,856 | Stocker | July 7, 1942 |
| 2,518,930 | Polydoroff | Aug. 13, 1950 |
| 2,561,537 | Sands | July 24, 1951 |

FOREIGN PATENTS

| Number | Country | Date |
|---|---|---|
| 435,884 | Great Britain | Oct. 1, 1935 |
| 502,131 | Great Britain | Mar. 13, 1939 |